May 2, 1961 J. M. BROWNLOW 2,982,732
FERRITE COMPOSITION CONTAINING TITANIUM AND NICKEL
Filed Dec. 30, 1957
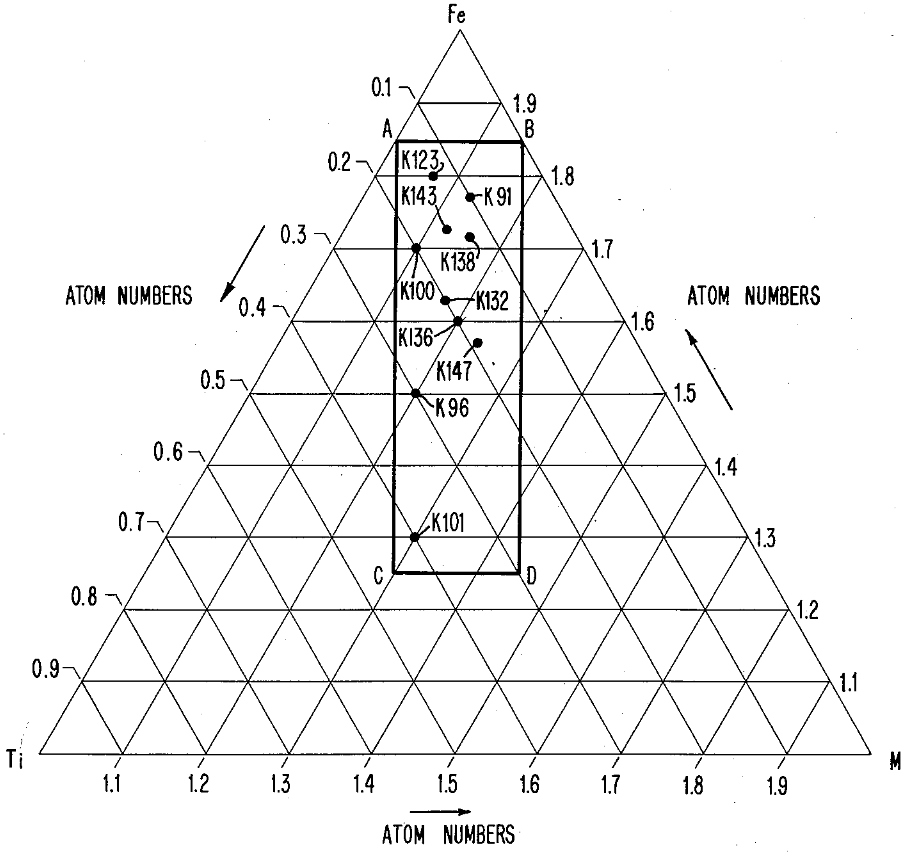
SYSTEM - M-Fe-Ti
INVENTOR
JAMES M. BROWNLOW
BY William V. Schelberg
AGENT 2,982,732
Patented May 2, 1961

2,982,732

FERRITE COMPOSITION CONTAINING TITANIUM AND NICKEL

James M. Brownlow, Poughkeepsie, N.Y., assignor to International Business Machines Corporation, New York, N.Y., a corporation of New York Filed Dec. 30, 1957, Ser. No. 706,176
5 Claims. (Cl. 252—62.5)

This invention relates to a ferromagnetic material of the square or rectangular hysteresis loop type. More particularly, it relates to a new chemical system of ferrite ceramics, suitable for use in computer mechanisms, containing $Fe^{3+}$, $Ti^{4+}$ and two divalent cations, $Mg^{2+}$ and $Ni^{2+}$.

Certain mixtures of the oxides of these cations form spinels which have square hysteresis loops when properly fired and quenched from high temperatures. Since manganese is readily capable of assuming one or more of several oxidation states in a ferrite, depending upon the ceramic procedures used in the preparation of the ferrospinel, certain exacting sintering conditions have been necessary to prepare manganese containing ferrospinels with any degree of reproducibility. The present system has been found to provide a square loop ferrite having the requisites for operation as a memory storage element and at the same time is readily adaptable to standard ceramic techniques and procedures for fabrication of memory cores.

An object of this invention is to provide a square loop ferrite having certain improved magnetic characteristics.

A further object of this invention is to provide a ferromagnetic memory storage core of the rectangular hysteresis loop type, which is capable of being prepared by more simplified sintering techniques than those hitherto required for similar systems containing manganese oxide.

Still another object is to provide a square loop ferrospinel having the composition Mg-Ni-Ti ferrite.

An object of this invention is to provide a square loop ferrospinel which has a zero magnetostrictive effect.

Other objects of the invention will be pointed out in the following description and claims and illustrated in the accompanying drawings, which disclose, by way of example, the principle of the invention and the best mode, which has been contemplated, of applying that principle.

In the drawing, the figure is a triaxial diagram for the chemical system Fe—Ti—M, where M is Mg/$a$ or Ni/(1−$a$) and $a$ ranges from 0.45 to 0.91. The area bounded by A—B—C—D is the preferred working range in this system.

By virtue of theoretical considerations and subsequent experimentation applicant has determined that the oxides of the tetravalent ion, $Ti^{4+}$ and the divalent ion, $Ni^{2+}$ could be combined with magnesium oxide and ferric oxide to produce a ferrospinel whose magnetic characteristics were suitable for operation in bistable memory systems.

In Table I the data represented in the triaxial diagram of the figure is compared with compositions in which the number of atoms of Ti and of Fe have been held constant while the relative amounts of the other two constituents have been varied. The hysteresis loop squareness ratio, Br/Bs, is also given for each composition.

TABLE I

*Composition (atom numbers)*

| Code No. | Fe | Mg | Ni | Ti | *a* | Br/Bs |
|---|---|---|---|---|---|---|
| K123 | 1.80 | 0.98 | 0.10 | 0.12 | 0.91 | 0.75 |
| K123-1 | 1.80 | 0.88 | 0.20 | 0.12 | 0.82 | 0.86 |
| K123-2 | 1.80 | 0.58 | 0.50 | 0.12 | 0.54 | 0.70 |
| K132 | 1.62 | 1.08 | 0.10 | 0.20 | 0.91 | 0.81 |
| K132-1 | 1.62 | 1.08 | 0.15 | 0.20 | 0.87 | 0.81 |
| K132-2 | 1.62 | 0.90 | 0.18 | 0.20 | 0.85 | 0.86 |
| K132-3 | 1.62 | 0.94 | 0.24 | 0.20 | 0.79 | 0.73 |
| K132-4 | 1.62 | 0.90 | 0.28 | 0.20 | 0.76 | 0.91 |
| K136 | 1.60 | 1.00 | 0.20 | 0.20 | 0.83 | 0.84 |
| K91 | 1.78 | 1.22 | 0.00 | 0.10 | 1.00 | 0.72 |
| K96 | 1.50 | 0.90 | 0.30 | 0.30 | 0.75 | 0.80 |
| K100 | 1.70 | 0.50 | 0.60 | 0.30 | 0.45 | 0.59 |
| K101 | 1.30 | 0.70 | 0.60 | 0.40 | 0.54 | 0.70 |
| K138 | 1.72 | 0.90 | 0.18 | 0.18 | 0.70 | 0.70 |
| K147 | 1.58 | 1.02 | 0.20 | 0.20 | 0.84 | 0.76 |
| K143 | 1.72 | 0.96 | 0.17 | 0.15 | 0.85 | 0.70 |

A preferred manner of preparing the ferrites of the present invention is the following: The ferrite powders are calcined at a temperature of approximately 1000° C. for a period of one to two hours and thoroughly mixed so as to form a homogeneous mixture of predetermined proportions. The mixture is subsequently ground so that the largest grain size is less than ten microns and a small percentage of lubricant material such as a monocrystalline wax or magnesium stearate and polyvinyl alcohol is added to reduce skin friction and warping during molding. The mixture is compacted in a steel die with sufficient pressure to form a closely coherent body, usually greater than 40,000 pounds per square inch. The pressed body is then calcined at 800–1000° C. to drive off the binder materials and moisture. The presintered body thus produced is enclosed in the covered receptacle as described, heated at 1000°–1650° C. in air for from 10 minutes to 24 hours, furnace cooled to about 850° C. during an additional 5–60 minutes and finally quenched to room temperature.

The pulse test data given in Table II is for Code No. K132–2 which was prepared by firing the oxide constituents at 1380° C. for 30 minutes, cooling to 1150° C. for 30 minutes in $CO_2$ and quenching to room temperature.

TABLE II

| | Driving Current (milliamps) | |
|---|---|---|
| | 0.62/380 | 0.78/390 |
| Ts (Switching time-microsec.) | 1.70 | 1.16 |
| Tp (Peaking time-microsec.) | 0.72 | 0.52 |
| Discrimination Ratio | 2.70 | 4.00 |

Applicant has discovered that the addition of even small amounts of $Mn^{3+}$ to the system of this invention results in a ferrospinel having a substantially reduced squareness ratio. Thus, as shown in Table III the incorporation of 0.13 atom of Mn in the base system has proven to be quite harmful.

TABLE III

| Code No. | Fe | Mg | Ni | Ti | *a* | Mn | Br/Bs |
|---|---|---|---|---|---|---|---|
| 144 | 1.63 | 0.98 | 0.10 | 0.16 | 0.83 | 0.13 | 0.50 |

Other divalent cations have been substituted for $Ni^{2+}$ in this system, including $Zn^{2+}$ and $Cu^{2+}$. Moreover, $Cr^{3+}$ or $Al^{3+}$ may also be substituted in part for $Fe^{3+}$.

The ferrite materials of this invention are suitable for application as memory elements in computer mechanisms and as ferrite cores in other selective logical applications. In addition, certain measurements of magnetostriction indicate that this parameter is zero over a range of compositions in this system. For example, when radial stress was applied to the ferrite composition designated as K132–2 in Table I no change was observed in the hysteresis loop. Similar treatment of core compositions K132–3 and K132 resulted only in a slight increase and decrease, respectively, in the squareness of the loop. Such unique magnetic properties, hitherto unavailable in other square loop ferrospinels, indicates the extreme stability of this system towards changes in applied stress during actual computer operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A rectangular hysteresis loop ferrospinel system consisting essentially of $Mg_w$, $Ni_x$, $Ti_y$, $Fe_zO_4$ where $w$ varies from 0.70 to 1.22, $x$ from 0.01 to 0.60, $y$ from 0.10 to 0.40 and $z$ from 1.30 to 1.80, said ferrospinel having a Br/Bs ratio of greater than 0.7.

2. A rectangular hysteresis ferrospinel consisting essentially of $Mg_{0.90}Ni_{0.28}Ti_{0.20}Fe_{1.62}O_4$, said ferrospinel having a Br/Bs ratio of 0.86.

3. A rectangular hysteresis ferrospinel consisting essentially of $Mg_{1.08}Ni_{0.10}Ti_{0.20}Fe_{1.62}O_4$, said ferrospinel having a Br/Bs ratio of 0.81.

4. The product formed by heating a mixture of magnesium oxide, nickel oxide, titanium oxide and ferric oxide in such molecular percentages as to form a rectangular hysteresis loop ferrospinel having the formula $Mg_w$, $Ni_x$, $Ti_y$, $Fe_zO_4$ where $w$ varies from 0.70 to 1.22, $x$ from 0.01 to 0.60, $y$ from 0.10 to 0.40 and $z$ from 1.30 to 1.80, at temperatures within the range 1000–1650° for 15 minutes to 24 hours, said product having a Br/Bs ratio of greater than 0.7.

5. The product formed by heating a mixture of magnesium oxide, nickel oxide, titanium oxide and ferric oxide in such molecular percentages as to form a rectangular hysteresis loop ferrospinel having the formula $Mg_{1.08}Ni_{0.10}Ti_{0.20}Fe_{1.62}O_4$ at 1380° C. for 30 minutes, furnace cooling to 1150° for 30 minutes in $CO_2$ and quenching to room temperature.

References Cited in the file of this patent

UNITED STATES PATENTS

| | | |
|---|---|---|
| 2,565,861 | Leverenz et al. | Aug. 28, 1951 |
| 2,579,978 | Snoek et al. | Dec. 25, 1951 |
| 2,659,698 | Berge | Nov. 17, 1953 |
| 2,736,708 | Crowley et al. | Feb. 28, 1956 |

FOREIGN PATENTS

| | | |
|---|---|---|
| 697,219 | Great Britain | Sept. 19, 1953 |
| 735,375 | Great Britain | Aug. 17, 1955 |
| 737,284 | Great Britain | Sept. 21, 1955 |

OTHER REFERENCES

Verwey: Aengewandte Chemie, Apr. 7, 1954, pages 189–192.

Gorter: Philips Research Reports, December 1954, pages 403–418.

Economos: J. Amer. Ceramic Soc., July 1955, page 242.